United States Patent [19]

Briltz

[11] Patent Number: 4,710,290

[45] Date of Patent: Dec. 1, 1987

[54] FLUID CLARIFYING ASSEMBLY

[75] Inventor: Raymond P. Briltz, Regina, Canada

[73] Assignees: 3M Holding Co. Ltd., Regina; Magill-Stephenson Company Limited, Winnipeg, both of Canada; a part interest

[21] Appl. No.: 768,247

[22] Filed: Aug. 22, 1985

[51] Int. Cl.$^4$ .................. C02F 1/52; B01D 21/08
[52] U.S. Cl. ........................... 210/199; 210/205; 210/521; 210/523; 210/533
[58] Field of Search ............ 210/713, 726, 727, 738, 210/802, 195.3, 197, 202, 205–208, 219, 319, 320, 521, 522, 523, 526, 199, 533

[56] References Cited

U.S. PATENT DOCUMENTS

| | | | |
|---|---|---|---|
| 2,596,082 | 5/1952 | Stuart | 210/738 |
| 3,399,135 | 8/1968 | Conley et al. | 210/807 |
| 3,595,396 | 7/1971 | Mackrle et al. | 210/208 |
| 3,630,893 | 12/1971 | Tanaka et al. | 210/738 |
| 3,886,073 | 5/1975 | Briltz | 210/136 |
| 4,055,494 | 10/1977 | Emmett | 210/738 |
| 4,111,802 | 9/1978 | Louboutin | 210/713 |
| 4,388,195 | 6/1983 | von Hagel et al. | 210/738 |
| 4,400,274 | 8/1983 | Protos | 210/521 |

FOREIGN PATENT DOCUMENTS

| | | | |
|---|---|---|---|
| 52-50064 | 4/1977 | Japan | 210/738 |
| 55-41127 | 10/1980 | Japan | 210/206 |

Primary Examiner—Peter Hruskoci
Attorney, Agent, or Firm—Stanley G. Ade; Adrian D. Battison

[57] ABSTRACT

Chemicals are added to a fluid such as sewage to flocculate and precipitate solids therefrom which are deflected downwardly and sink by gravity to the base of an elongated chamber so that the substantially clarified fluid flows over a weir at one end of the chamber with the flocculated and precipitated material forming a sludge in the base thereof whereafter it may be removed either through a fluid lock device or pressurizing the system to stratify the flow and provide still areas for the sludge to settle through the fluid and be removed as required.

26 Claims, 34 Drawing Figures

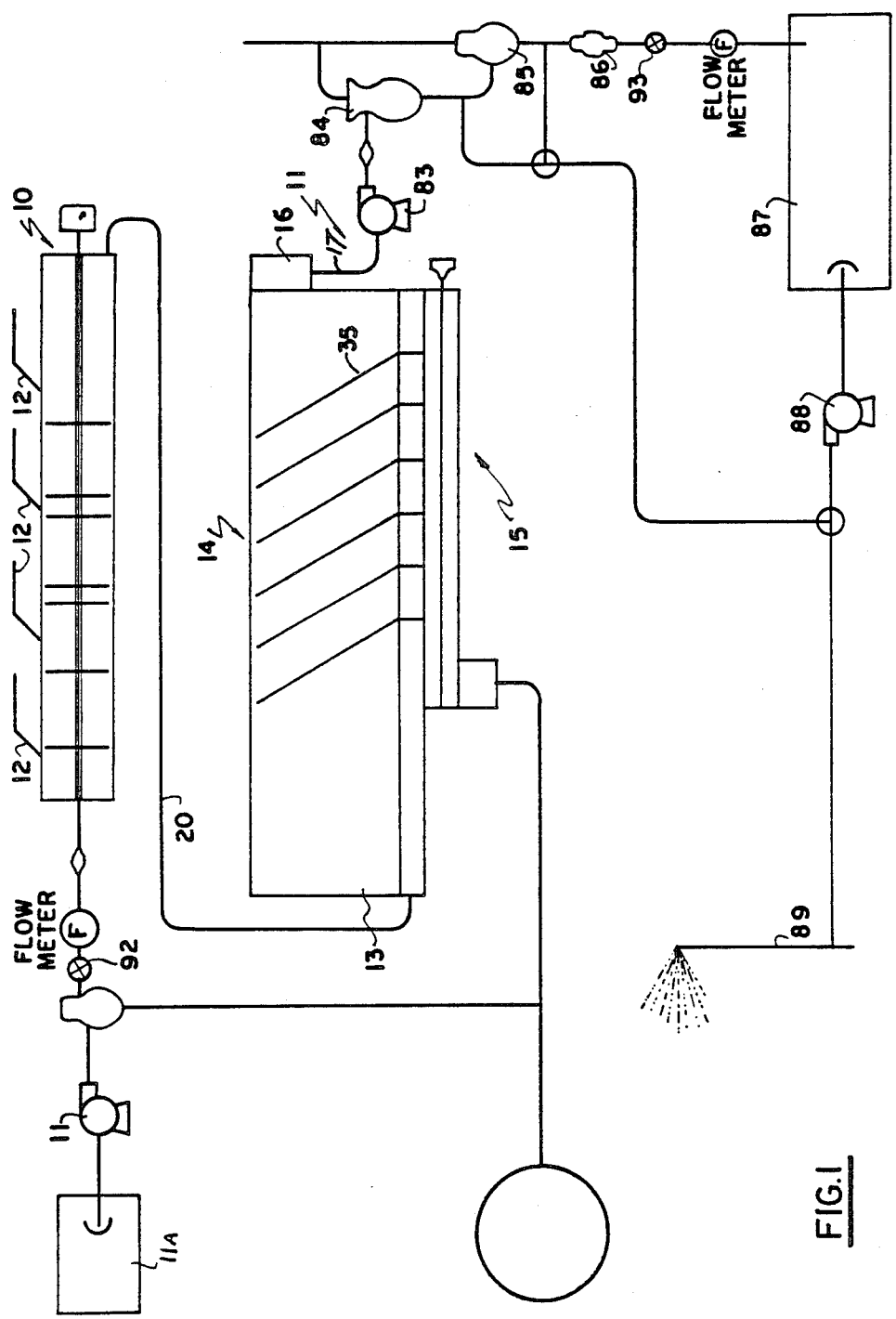

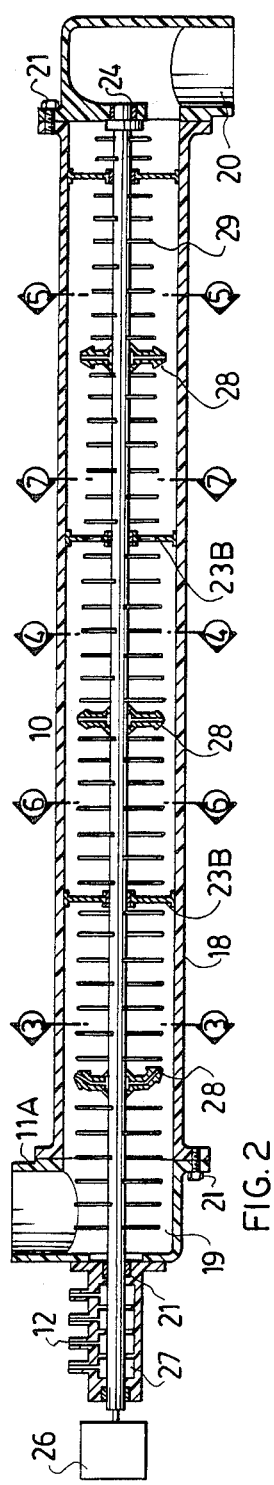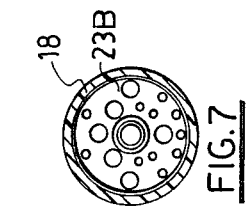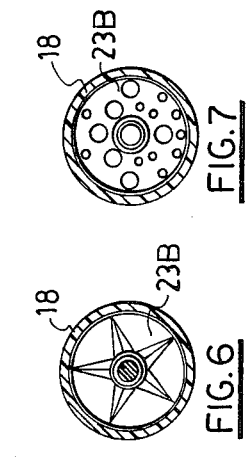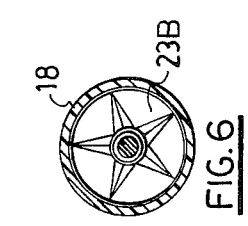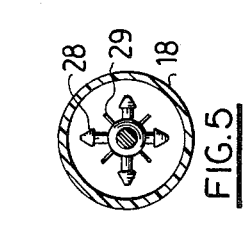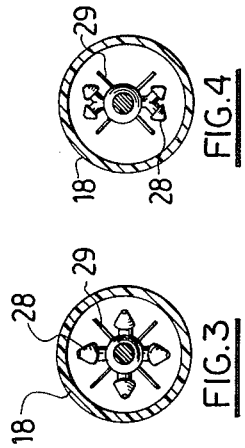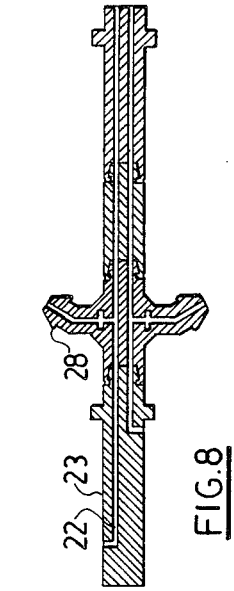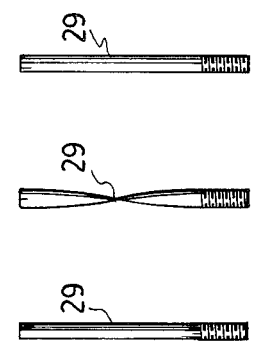

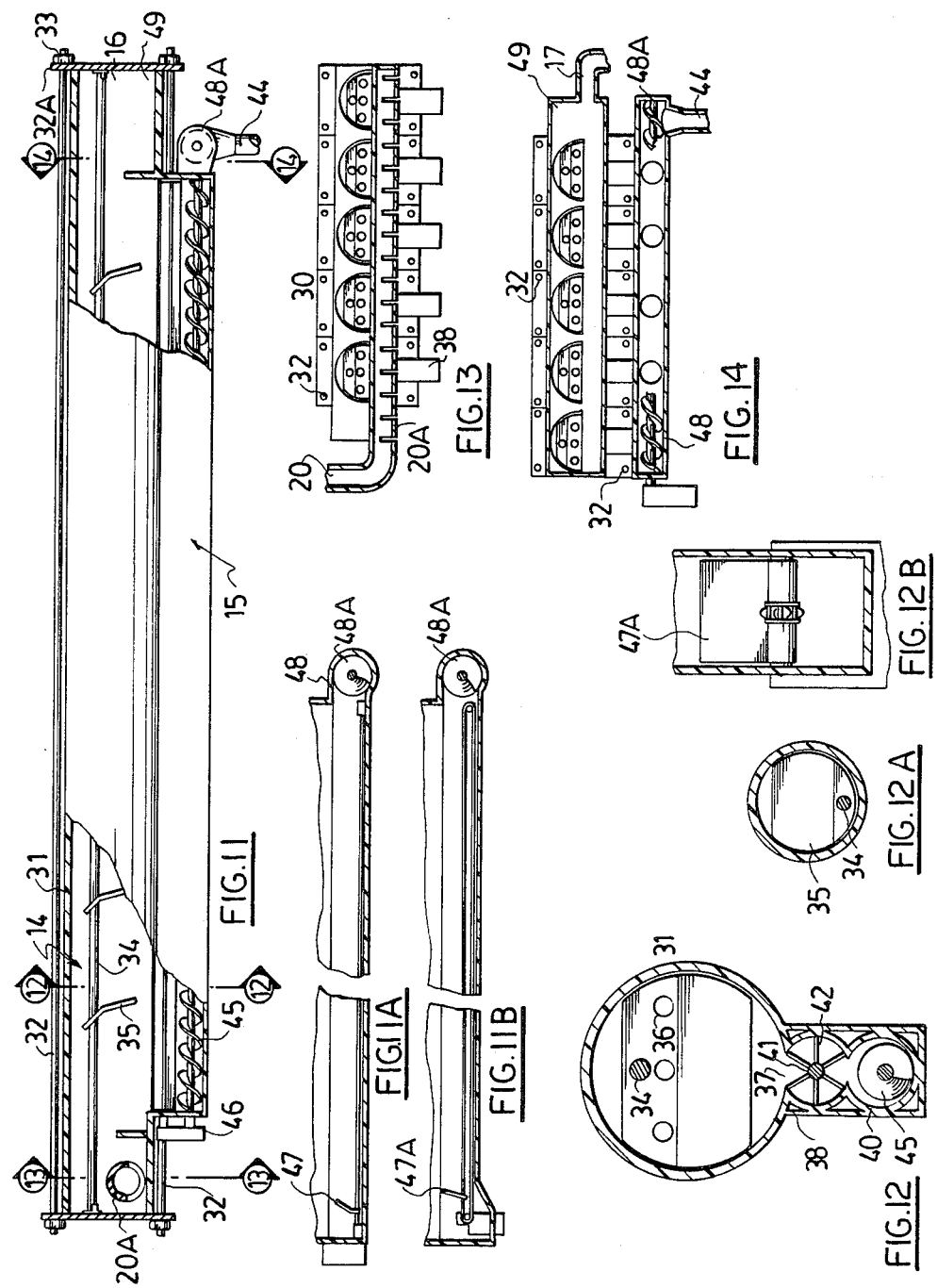

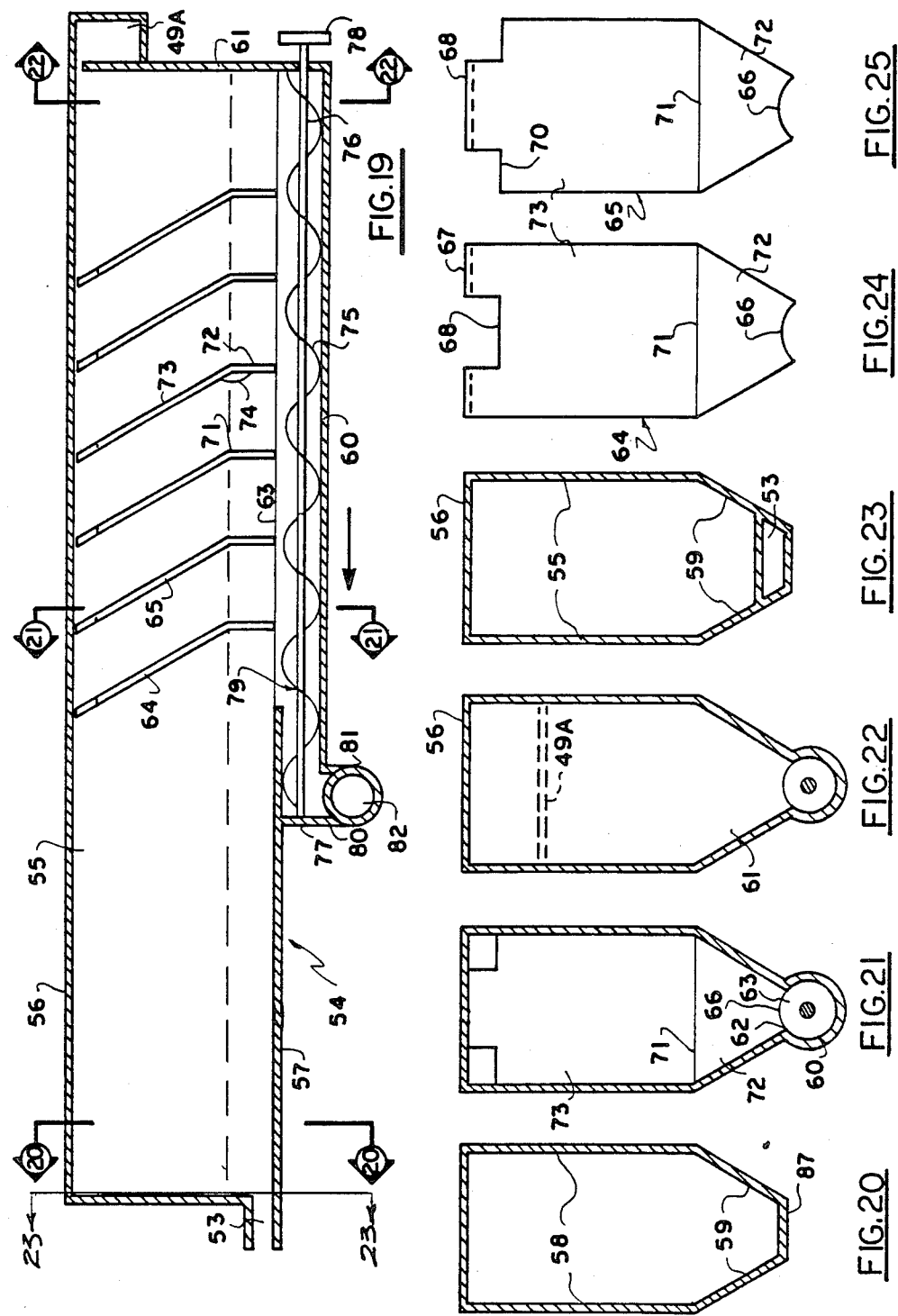

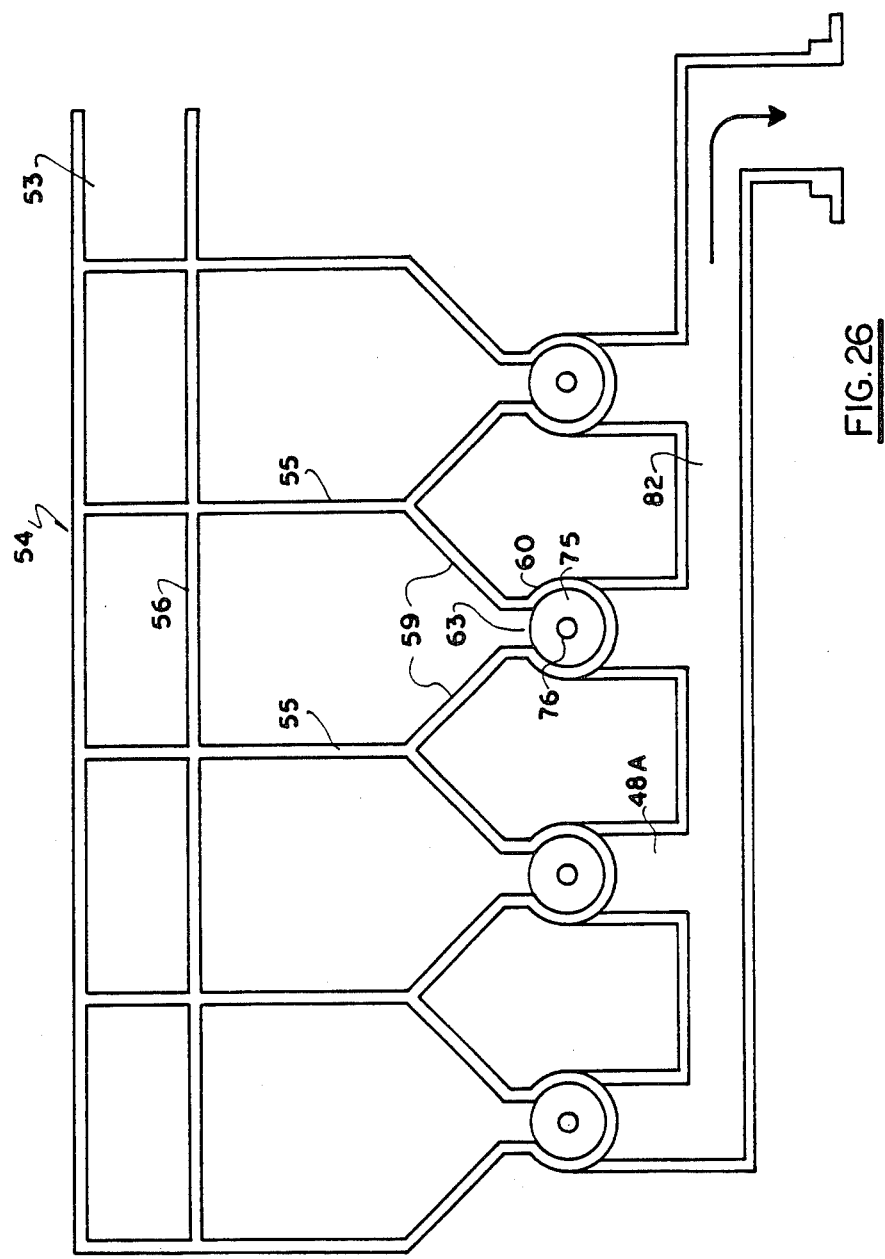

FLUID CLARIFYING ASSEMBLY

BACKGROUND OF THE INVENTION

This invention relates to new and useful improvements in assemblies and methods for removing sediment and the like from solutions either liquid and/or gas, and although it is directed primarily for the clarification of sewage, nevertheless it will be appreciated that it can be used for clarifying other industrial wastes or the like, depending upon the materials either suspended or in the solution within said fluids.

Many attempts have been made to provide an efficient yet reasonably economical method and apparatus for this purpose and an example is U.S. Pat. No. 3,886,073 which issued to Raymond P. Briltz on May 27, 1975.

However, this and other methods suffer from several disadvantages, the principal ones of which are that they are not particularly efficient and secondly, the cost of construction and maintenance is usually relatively high.

SUMMARY OF THE INVENTION

The principles behind the apparatus and method is the addition of various chemicals to the raw sewage or other fluids, within a mixing chamber which causes flocculation and/or precipitation of the various solids so that a sludge is formed. This sludge is then passed to a modular treatment assembly comprising a sedimentation extraction assembly which consists of one or more sludge remover tubes in which the chemically treated fluid flows slowly therethrough with the solids settling out into a sludge discharge tube from whence it can be removed with the substantially clarified liquid passing over a weir at the distal end of the sludge removal tube to a further treatment plant if desired or necessary.

The chemistry required to flocculate and/or precipitate the various solids from the liquid, is well known and it is therefore not believed necessary to describe this chemistry except to say that the various chemicals are selected and injected depending entirely upon the make-up of the liquid being clarified.

One aspect of the invention is to provide a fluid clarifying assembly comprising in combination a mixing tube assembly having a fluid intake at one end and a fluid outlet at the other end, means to inject chemicals selectively into said assembly to flocculate and/or precipitate material from said fluid thus forming sludge, a sedimentation extracting assembly having a fluid and sludge intake at one end and a liquid outlet at the other end thereof, means operatively extending between said fluid outlet of said mixing tube assembly to said fluid inlet of said sedimentation extracting assembly, said sedimentation extracting assembly including an elongated chamber, sludge collecting and settling means in said chamber, means at the base of said chamber to remove said sludge, said fluid less the majority of said sludge passing through said outlet means in sais sedimentation extracting assembly.

Another aspect of the invention is to provide a method of substantially clarifying liquids and fluids containing solids and/or dissolved materials consisting of the steps of adding flocculating and/or precipitating chemicals to the liquid, mixing the chemicals and liquid together in a mixing chamber to form a sludge of flocculated, precipitated and solid materials within the liquid, transferring the liquid and sludge to and through a sludge removal chamber, deflecting the sludge to the base of the sludge removal chamber by means of a plurality of baffles within the sludge removal chamber, and removing the substantially clarified liquid from the top of the sludge removal chamber.

A further advantage of the invention is provide a device and method of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention in which:

DESCRIPTION OF DRAWINGS

FIG. 1 is a schematic view of the system.

FIG. 2 is a longitudinal section through one of the mixing tubes per se.

FIG. 3 is a cross section of FIG. 2 along the line 3—3 of FIG. 2.

FIG. 4 is a cross section through the mixing tube along the line 4—4 of FIG. 2.

FIG. 5 is a cross section of the mixing tube along the line 5—5 of FIG. 2.

FIG. 6 is a cross section of the mixing tube along the line 6—6 of FIG. 2.

FIG. 7 is a cross section through the mixing tube along the line 7—7 of FIG. 2.

FIG. 8 is a fragmentary sectional elevation of part of the mixing tube shaft.

FIG. 9 is an enlarged fragmentary longitudinal section of one of the junctions of the mixing tube shaft.

FIG. 10 is an elevational view of one of the mixing rods.

FIG. 10A is a view similar to FIG. 10 showing a variation thereof.

FIG. 10B is a view similar to FIG. 10 showing a further variation thereof.

FIG. 11 is a longitudinal sectional view of one of the sludge removal tube components.

FIG. 11A illustrates an alternative conveyor system to FIG. 11.

FIG. 11B illustrates a further alternative conveyor system to that shown in FIG. 11.

FIG. 12 is a cross sectional view along the line 12—12 of the sludge removal tube component of FIG. 11.

FIG. 12A is a cross sectional view of FIG. 11A.

FIG. 12B is a cross sectional view of FIG. 11B.

FIG. 13 is a cross sectional view along the line 13—13 of FIG. 11.

FIG. 14 is a cross sectional view along the line 14—14 of FIG. 11.

FIG. 19 is a partially schematic longitudinal section of one of the sedimentation extraction or sludge removal tubes.

FIG. 20 is a cross sectional view along the line 20—20 of FIG. 19.

FIG. 21 is a section along the line 21—21 of FIG. 19.

FIG. 22 is a section along the line 22—22 of FIG. 19.

FIG. 23 is a section along the line 23—23 of FIG. 19.

FIG. 24 is a front elevation of one form of baffle.

FIG. 25 is a front elevation of the other form of baffle.

FIG. 26 is an end view of FIG. 19 taken from the right hand side thereof.

In the drawings like characters of reference indicate corresponding parts in the different figures.

DETAILED DESCRIPTION

Figure 15:
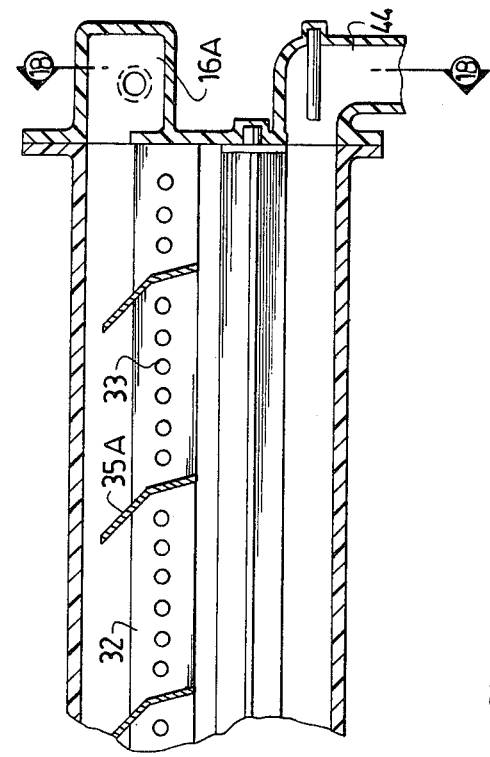
FIG. 15 is a view similar to FIG. 2 but showing an alternative embodiment.
Figure 16:
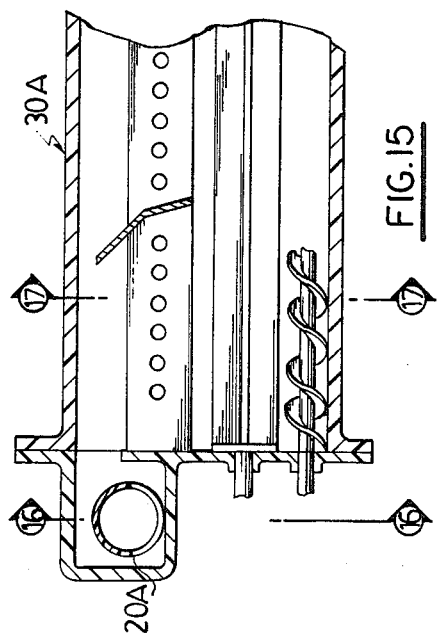
FIG. 16 is a section along the line 16—16 of FIG. 15.

Proceeding therefore to describe the invention, reference should first be made to FIGS. 1, 2 and 9 in which reference character 10 illustrates the mixing chamber receiving sewage or the like from pump 11 connected to raw sewage tank 11A, with various chemicals being injected along the length of the mixing chamber via the injection lines 12 from the chemical feed system (not illustrated). This feed system may be computer controlled with analyses being made to ascertain the quantity and type of chemicals to be injected in order to cause the maximum flocculation and/or precipitation of the undesirable components in the liquid such as raw sewage.

From the mixing chamber, the liquid or fluid passes to an inflow end chamber or header 13 leading to a sludge removal tube assembly collectively designated 14 which includes a sedimentation extraction system collectively designated 15 and a clarified liquid end chamber 16 leading to a clarification filter 84 via conduits 17 (see FIGS. 1 and 14). This sedimentation extraction system may be built integrally with the mixing chamber as individual cells or may be connected by conduits 20 as in FIG. 1, the latter being the preferred embodiment.

Reference to FIGS. 2 through 10 illustrate details of the mixing tube assemblies 10, each of which consists of an elongated tube 18 having an intake chamber 19 at one end and a discharge end assembly 20 at the other end clamped to the tube by means of bolts 21 as clearly shown.

A hollow shaft 23 is journalled for rotation between sealed bearing 24 at each end thereof and intermediate sealed bearings 25 within the tube 18 and a variable speed electric motor 26 is operatively connected to the shaft 23 and rotates same.

FIG. 6 shows spider plates 26 within a ring 26A engaging the wall of the tube 18 to support bearings 25 and FIG. 7 shows the multi-apertured flow control plates 23B which also support bearings 25 and engage the tubular wall. These plates control the flow and mixing turbulence of the liquid passing therethrough. And may include O-rings (not illustrated) between them and the tube wall.

The intake chamber includes a plurality of chambers 27, each one fed chemicals from one of the lines 12 so that various chemicals can be injected, the chemicals entering the hollow rotatable shaft 23, by apertures through the wall thereof within the individual annular chambers 27. The sewage or other liquid enters the tube 18 via the main intake 11A, from the raw sewage supply pump 11.

The apertures within the hollow shaft 23 connect with conduits 22 extending through the hollow shaft which act as chemical injection lines, each conduit terminating and communicating with one of a plurality of radially extending nozzle assemblies 28 secured to the shaft 23 and radiating therefrom as clearly shown in FIGS. 3, 4 and 5 said nozzle assemblies being situated along the length of the tube 18 and acting to inject various chemicals as desired, within the liquid in the tube 18.

A plurality of mixing rods 29 extend radially from the shaft 23 and assist in mixing the various chemicals with the liquid flowing along the tube to the discharge 20. These rods are shown in FIGS. 3, 4 and 5 as well as in other longitudinal sections of the tube.

A plurality of plates 23B and spiders 26 are provided along the length of the tube 18 acting as flow control or flow regulating plates and also acting as supports for the sealed bearings 25. These plates are shown in detail in FIGS. 6 and 7.

FIG. 8 shows a longitudinal cross sectional view of the rotating shaft assembly 23 with the various nozzle assemblies 28 and the internal conduits 22 connected to the individual chambers 27 and these can be formed in sections and snap engaged together with locking sleeves 23A as clearly shown in FIG. 9, in order to provide the necessary number and location of the nozzle assemblies along the length of the shaft, depending upon design para-meters.

Reference to FIG. 9 will also show that the conduits 22 are provided with tapered connectors 23B which are drilled if the fluid conduit is to continue beyond this point, but which are solid if the conduit does not pass this particular junction, it being understood that individual conduits lead to individual nozzle assemblies 28 along the length of the shaft 23.

FIGS. 10, 10A and 10B show various shapes of mixing rods of varying lengths which are screw threadably engaged within the wall of the hollow shaft 23 and extend radially therefrom.

The liquid or fluid mixed with the chemicals for flocculation and/or precipitation of solids, passes from the tube 18 through the discharge 20 and is communicated with a plurality of sludge removal tube assemblies shown in detail in FIGS. 11 through 14. The discharge 20 leads to a transverse tube or intake manifold 20A (see FIG. 13) operatively connected to a plurality of inflow chambers 13 situated one at one end of each of the sludge removal tube assemblies 14. Each sludge removal tube assembly 14 consists of an elongated tube 31 clamped to the inflow chambers 13 at one end thereof and an end outlet chamber 16 at the other end thereof, by means of bolts or studs 32 extending from end flanges 32A at each end of the tubes 31.

The liquid and chemical mixture flows slowly through the sludge removal tubes which contain a support rod 34 carrying a plurality of baffles 35 thereon and angulated as shown in FIG. 11. These baffles may include perforations or apertures 36 and may be relatively solid. In all cases space is provided at the upper sides thereof for the passage of liquid therepast. They are designed to permit the separation by gravity, of the solids and flocculents within the mixture, towards the lower side of the tube 31 which is provided with an elongated discharge slot 37 shown in FIG. 12. Situated below the tube 31 is a casing 38 containing a separator tube 39 and a discharge tube 40 therebelow with the separator tube communicating with slot 37 and also with the other side of the discharge tube 40.

A shaft 41 is journalled for rotation throughout the length of the separator tube 39 and a plurality of vanes 42 extend radially from the shaft 41 and are provided with rubber gaskets 43 on the extremities thereof engageable with the inner wall of tube 39 so that the assembly acts as a fluid lock. Sludge deposited by gravity in the lower side of tube 31 enters a segment between two adjacent vanes 42 and this assembly is rotatable on a timed basis to move the segment of sludge around the tube and finally to deposit same by gravity into the discharge tube 40 yet at the same time preventing liquid from passing from tube 31 to tube 40 with the exception of the small amount of liquid contained within the sludge being removed.

Once deposited in the discharge tube 40, various means are provided to discharge the sludge through a drain pipe 44 at the distal end of tube 40. Reference character 45 illustrates an auger assembly which is preferably operatively connected to the timed separator assembly by means of gears within casing 46. Alternatively, FIGS. 11A and 12A show a retractable baffle assembly 47 driven by a source of power which moves the sludge along the tube to the discharge 44. FIGS. 11B and 12B show a yet further alternative to the endless belt baffle assembly indicated by reference character 47A.

All of the sludge removal tubes discharge into a transverse sludge manifold 48 with transverse auger sections 48A moving the sludge to the drain pipe 44 (see FIG. 14). The clear liquid passes through the sludge removal tubes 31 to the end chamber 49 and is thence discharged over the separator disc 30 which acts as a weir and is shown in FIGS. 13 and 14 to a conventional clarification filter or the like (not shown).

The various chemicals for the flocculation and/or sedimentation of the solids within the fluid will of course depend upon the fluids being clarified and are well known in the art.

The various speeds of operation can of course be controlled and once again may be varied depending upon design parameters and the circumstances under which the device is operating.

Further embodiments are shown in FIGS. 15 to 28 inclusive with the preferred embodiment being illustrated in FIGS. 19 to 28 and where common subject matter is found, similar reference characters have been given with the exception that the suffix "A" has been added.

Figure 17:
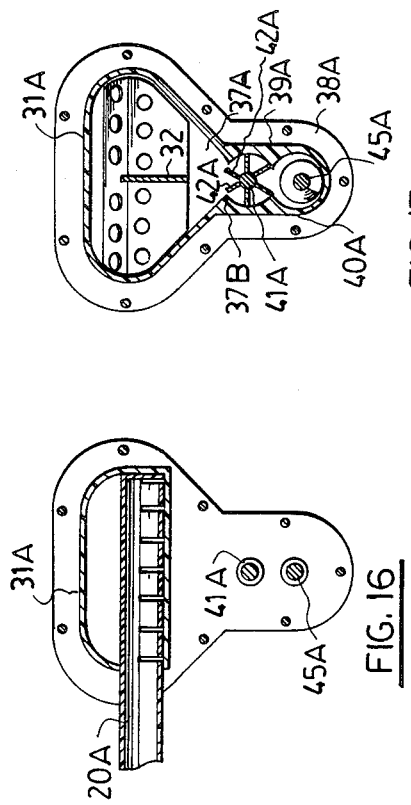
FIG. 17 is a section along the line 17—17 of FIG. 15.
Figure 18:
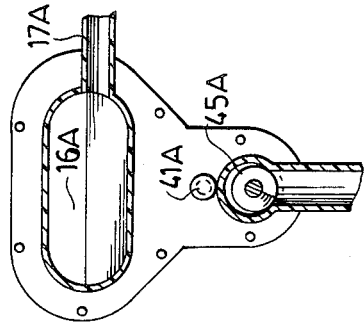
FIG. 18 is a section along the line 18—18 of FIG. 15.

Dealing first with the embodiments shown in FIGS. 15 through 18, this arrangement is very similar to that shown in the previous embodiments with the exception that the settling chamber 31A is non-circular and is substantially oval-shaped as clearly shown in the section shown in FIG. 17. This increases the capacity considerably with a minimum increase in dimensions and enables a different baffle system to be incorporated. In the baffle system shown in FIGS. 15 through 18, a longitudinally extending baffle 32 is shown which is apertured as at 33 and this is situated centrally of the chamber and extends upwardly from the lower side thereof as clearly shown in FIGS. 15 and 17.

The cross baffles or transverse baffles 35A interlock in spaced and parallel relationship along the length of the longitudinal baffle 32 and are angulated and apertured in a manner similar to those hereinbefore described.

An elongated discharge slot 37A is provided on the lower side of the tube 31A but it will be noted that the walls defining the discharge slot 37A are rounded as at 37B to aid in the movement of the sludge downwardly into the timed separator mounted on shaft 41A and operating in a manner as hereinbefore described. This separator deposits the sludge into the discharge tube 40A from whence it is removed by the auger assembly 45A as hereinbefore described.

In the preferred embodiments illustrated in FIGS. 19 through 28 it should be noted that the timed control separator rotors on shafts 41 may be eliminated with the consequent result that the discharge augers 45 may be moved up into this position thus eliminating the double vertical chamber assembly illustrated.

In the preferred embodiment, it will be appreciated that the mixing chamber assembly 10, previously described, is utilized with the outlet 20 being operatively connected to a cross header similar to that illustrated by reference character 20A in FIG. 13 and that this header leads to individual tube intakes 53.

The sludge removal assembly in FIG. 19 is collectively designated 54 and includes the sedimentation removal tube 55 which is of rectangular cross section and includes upper wall 56, lower wall 57, and spaced and parallel side walls 58.

The bases of these side walls incline inwardly and downwardly as at 59 and terminate in a relatively narrow base 57 for the first portion thereof, but terminate in a cylindrical tube 60 for the major portion thereof to the distal or discharge end plate 61 with the space between the lower ends 62 of the sloping sides 59 forming an elongated discharge slot 63.

The fluid mixed with the chemicals enters the tube 55 and engages with a plurality of baffles 64 and 65 spaced apart along the length of the major end portion of the tube 55.

These baffles are of two types and consist of a first set collectively designated 64 and a second set collectively designated 65 which are alternately situated along this major portion of the tube.

Baffles 64 are also substantially rectangular when viewed in front elevation and follow the contours of the tube 55 terminating in an arcuately curved base portion 66 which, when installed, engages over the discharge slot 63 and has a similar radius to that of the tube 60.

The upper side 67 is provided with a central rectangular cut-out 68 as clearly shown in FIG. 24. The The other set of baffles 65 are similar in configuration to those forming the set 64 with the exception that the upper side 68 is provided with two cut-out portions 70, one on each outer corner thereof as clearly shown in FIG. 25.

These upper sides 67 and 68 engage the upper wall 56 of the tube so that fluid flowing therethrough takes a horizontal serpentine path as it passes the alternately situated baffles 64 and 65 and that this flow is also adjacent the upper wall 56 of the chamber.

All baffles are angulated horizontally towards the lower ends thereof along a line indicated by reference character 71 so that the base portions 72 are substantially vertical and the upper portions 73 angulate upwardly and rearwardly from this line 71 so that the included angles 71 face upstream of the fluid passing through the sedimentation separation chamber 54.

As the fluid passes slowly through the chamber to the discharge header 49A, it is forced to travel past the baffles adjacent the upper wall 56 thereof as hereinbefore described and over a weir 74 formed in the end wall 61, the space between the weir and the upper wall being relatively narrow as clearly shown in FIG. 19.

The formation and location of the baffles together with the shape thereof causes the flocculents and precipitates to be deposited by gravity in the base of the chamber 54 and the sloping sides 59 of the lower walls of the chamber guide them to the discharge slot 63 and thence into the tube 60 within which may rotate a conveyor such as a screw conveyor 75 mounted on shaft 76 and supported within bearings in an end wall 77 and end wall 61. It may be driven by any means such as sprocket 78 and may be timed to rotate, when necessary. The horizontal serpentine motion of the fluid at the upper sides of the baffles stratifies the flow and causes still pockets or locations below the moving upper layer and in between adjacent baffles.

The sludge formed by the flocculents and precipitates collect within the sloping sides 59 of the chamber directed downwardly by the baffles 64 and 65 and through the discharge slot 63 in sections between adjacent baffles due to the fact that these baffles extend downwardly almost into contact with the auger flighting 75.

The auger assembly discharges same into discharge outlets 80 at one end of the auger assemblies which in turn deposits same in a cross header 81 from whence it may be removed by a further auger assembly or other form of conveyor 82 shown in FIG. 26, to a collecting tank (not illustrated). This tank is sealed so that the entire assembly may be pressurized by adjustment of control valves 92 and 93, in order to prevent liquid or fluid flow at and below the discharge slot 63. It should be understood that the entire assembly is filled with relatively clear water before the fluid to be clarified is introduced thus forming and maintaining the still areas or locations so that only sludge moves downwardly through the slot and is removed to the tank by the auger 79.

The substantially clarified liquid passing over weir 74 into the header 49A may be then transferred by pump 83 (see FIG. 1) to further treatment facilities such as filter 84, carbon filter 85, ultraviolet sterilizer 86, to clarified water storage 87.

Back flushing may occur from this storage 87 by means of back flush pump 88 as shown schematically in FIG. 1 and thence to an irrigation system 89 or other disposal means for this partially contaminated water.

Figure 27:
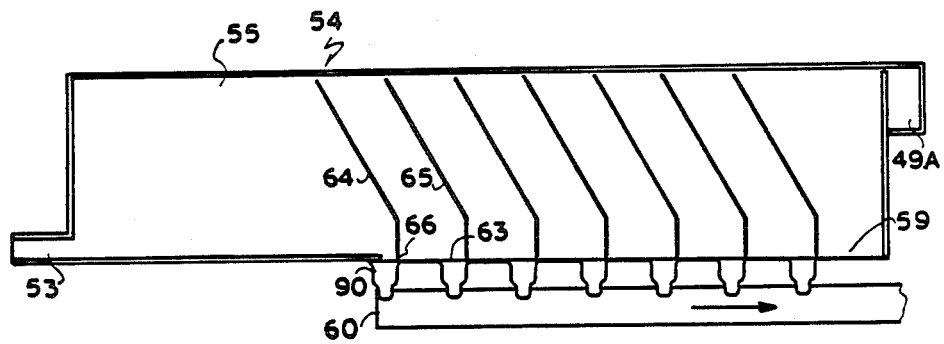
FIG. 27 is a schematic view of a further embodiment of the sedimentation extraction tube.
Figure 28:
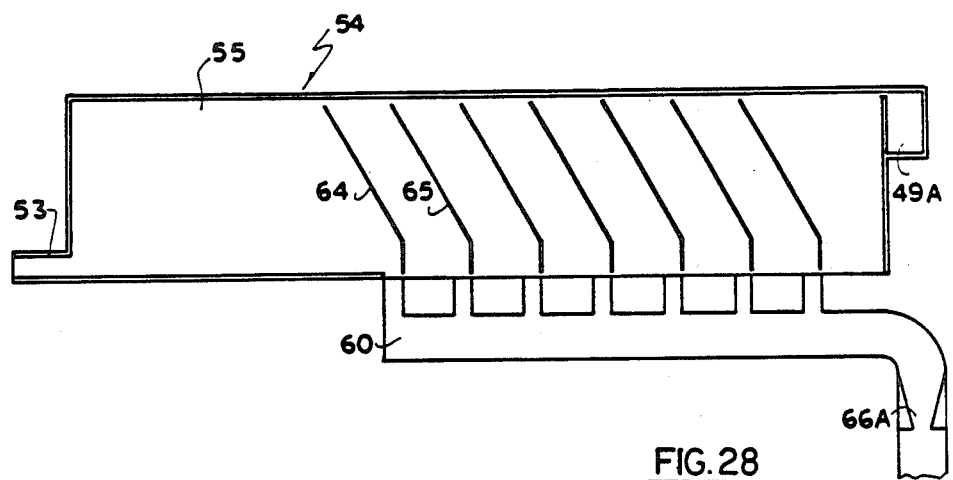
FIG. 28 is a view similar to FIG. 27 but showing an alternative embodiment thereof.

FIGS. 27 and 28 show schematically further extraction means for the sludge from the lower sloping sides 59 of the side walls 55.

In FIG. 27, the discharge slot 63 underneath the baffles 64 and 65 communicate with a venturi assembly 90 underneath and forwardly of each baffle base 66 and these venturi assemblies lead into a discharge tube 60 through which matter may be fed under pressure to extract the sludge when desired. Conventional separators may then be used for the flocculated and precipitated material and the water which may be re-used.

A similar venturi system 66A may be used in the discharge end 91 of the tube 60, once again acting as an extractor to pull out the sludge as it builds up in the discharge area.

Once again in all of the embodiments illustrated, it will be appreciated that mechanical fluid locks may be utilized if desired, or the pressurized system of FIGS. 19 to 28.

The Modular Fluid Clarifying Assembly may be summarized as follows:

Phase I Mixing Chamber Assembly
  A. Mixing Chamber 10
    1. One tube or conduit, the size as determined by the rate of untreated fluid flow required.
    2. The tube is provided with an inlet and an outlet chamber.
  B. Injection Manifold 19
    1. This is a divided sealed manifold attached to the inlet end of the mixing chamber 10.
    2. This manifold is provided with various inlets for the purpose of injecting various chemicals into the mixing chamber under pressure, as required.
  C. Main Shaft Tube 23
    1. This is a hollow tube 23 attached to the injection manifold 19 and extending through the entire length of the mixing chamber.
    2. This hollow tube houses a plurality of smaller conduits 22 to carry various chemicals from the injection manifold to specific nozzles 29 inside the mixing chamber, for dispersement of the chemicals into the untreated fluid at various stages inside the mixing chamber. This makes possible a more precise injection of chemicals resulting in more efficient fluctuation, dropout and sedimentation.
    3. This center tube is attached to variable speed motor 26 and can be rotated at various speeds required for proper dispersal and mixing of chemicals into the untreated fluid for maximum rapid flocculating action.
    4. There can also be variable speed or reduction gears or the like (not illustrated) situation at various distances along the center main shaft, for the purpose of producing different speeds of rotation in different areas of the mixing chamber. This is useful because some chemicals require more rapid mixing than others and some chemicals, require no mixing at all.
  D. Injection Nozzles 28
    1. These are attached to the main shaft tube and extend radially therefrom at various locations along the length thereof in order to allow the injection of various chemicals into the fluid to be treated, thus giving a more precise blend for mixing and resulting in more efficient and rapid flocculation and sedimentation.
  E. Mixing Rods 29
    1. The main shaft has attached to it many variously designed mixing rods of different lengths, spaced apart to give a total and immediate mixing of the chemicals and untreated fluid, for a rapid and efficient flocculation and sedimentation action.
  F. Flow Plates 23B
    1. These will serve for better blending of all solutions as well as stabilizing the fluid flow thereby assisting chemical reactions and any other processes, thus leading to rapid, efficient flocculation and sedimentation.

Conclusions:
  The mixing chamber assembly gives the operating chemist the same abilities to treat solutions in water or other fluids as are available in his laboratory. These abilities include injecting and mixing various chemicals in the required quantities, into solutions at precise times and locations with proper mixing speeds to create the most rapid reaction thus resulting in superior flocculation and dropout of the solids. This also allows for a more economical method because the use of excessive chemicals, additional holding tanks and additional reaction times are not required.

Phase II Sedimentation Chamber Assembly and Sludge Removal 14

A. Sedimentation Chamber and Sludge Removal Tube 31
  1. Singular or multiple numbers of tubes assembled together by a common inlet chamber or manifold and a common outlet chamber or manifold.
  2. These tubes may vary in cross sectional design e.g. round, square, oblong, rectangular and the like. They may also vary in length and diameter but will of a design and size required to result in the most effective dropout of the chemically treated fluid coming from the mixing chambers.

B. Inlet and Outlet Chambers 20A and 49 Respectively
  1. The fluid from the mixing chamber is distributed and stabilized in the inlet chamber before entering the sedimentation chambers.

C. Baffles 35
  1. These are the components which are mounted or attached to a rod 34 or other support, situated lengthwise through the sedimentation chamber.
  2. The purpose of these baffles is to cause the flocculants or sediments in the fluid to precipitate downwardly to the stair areas and thence to the removal area at the lower part of the sedimentation chamber. The baffles, permit a stable laminar fluid flow throughout the lower portion of the sedimentation chamber, so that separation of flocculants and sediments will be accomplished resulting in relatively clear fluids flowing out to the outlet chamber.

D. Sludge Removal (to clarifiers or filters when desired)
  1. Once the flocculants and/or other accumulated particulars or sediments dropped to the bottom of the sedimentation chamber, they will be isolated and may be removed by various means such as auger, venturi action, electrical or magnetic field action, addition of further flocculants and/or particles to improve sedimentation process, belt or chain and baffle assemblies. The particles will then drop into a sludge removal auger chamber 15 operated by variable speed motor 46 and the concentrated sludge may then be dropped into a pressurized chamber consisting of a disposal holding tank or the like 94 (see FIG. 1).

Conclusion:
The purpose is to take the major portion of the accumulated particles and condensed flocculants into the sludge removal area at the lower side of the sedimentation chamber without destroying or disturbing the flocculation/sedimentation process. The total system is preferably pressurized to maintain the laminar flow throughout and this can be regulated by various pressure valves 92, 93 and the like or, alternatively, by arranging the entire system to operate with a gravity flow, the speed once again being controlled by valves 92 and 93.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A fluid clarifying assembly comprising in combination a mixing tube assembly, a fluid intake at one end thereof, a fluid outlet at the other end thereof, a plurality of selective and discrete chemical injection means for the flocculation and precipitation of materials contained in said fluid, operatively connected to said mixing tube assembly, said flocculating and precipitation of materials forming a sludge, and a main shaft journalled for rotation within said mixing tube assembly, said discrete chemical injection means being operatively connected to said shaft, chemical injection nozzles along the length of said shaft, separate conduits extending through said shaft and communicating between individual chemical injection means and individual injection nozzles and mixing means on said shaft, a sedimentation extraction assembly, means operatively connecting said mixing tube assembly to one end of said sedimentation extracting assembly, said sedimentation extraction assembly including an elongated separating tube, said means operatively connecting said mixing tube assembly to said one end of said sedimentation extracting assembly being operatively connected to one end of said separating tube, a plurality of baffles along the length of said separating tube guiding the sludge towards the base of said separating tube, means at the base of said separating tube to remove sludge therefrom, said baffles including means at the upper side thereof forming a passage with the upper wall of said separating tube, said upper sides acting as weirs and means for removing clarified fluid flowing over said weirs from the other end of said sedimentation extraction assembly.

2. The assembly according to claim 1 in which said baffles are angulated transversely to form angulated plates spanning said separating tube with the included angle facing upstream.

3. The assembly according to claim 2 in which said separating tube includes a longitudinally extended, vertically apertured baffle extending along the length of said tube, said transverse baffles being interlocked over said longitudinally extending baffles in spaced apart relationship.

4. The assembly according to claim 2 in which said separator tube is of rectangular cross section, said baffles including a first set of baffles and a second set of baffles, all of said baffles being substantially rectangular in cross section and spanning said extraction tube from side to side and terminating with a horizontal upper edge, said baffles of said first set having a cut-out portion at each upper corner thereof defining a divided passage past each baffle of said first set, adjacent the junction between the upper side of the walls of the separating tube and the upper side of said separating tube, said baffles of said second set having a cut-out portion centrally of the upper side of said baffles of said second section defining a passage past each baffle of said second section, centrally of the upper side and the upper wall of the separating tube, said baffles from said first and second sets being situated alternately along the major portion of said separating tube above said sludge discharge slot, said passages forming a horizontal serpentine stratified path for said fluid past said baffles and still fluid locations therebelow, between adjacent baffles.

5. The assembly according to claim 1 in which said separating tube includes a longitudinally extended, vertically apertured baffle extending along the length of said tube, said transverse baffles being interlocked over said longitudinally extending baffles in spaced apart relationship.

6. The assembly according to claim 1 in which said separator tube is of rectangular cross section, said baffles including a first set of baffles and a second set of baffles, all of said baffles being substantially rectangular in cross section and spanning said extraction tube from side to side and terminating with a horizontal upper edge, said baffles of said first set having a cut-out portion at each upper corner thereof defining a divided passage past each baffle of said first set, adjacent the junction between the upper side of the walls of the separating tube and the upper side of said separating tube, said baffles of said second set having a cut-out portion centrally of the upper side of said baffles of said second section defining a passage past each baffle of said second section, centrally of the upper side and the upper wall of the separating tube, said baffles from said first and second sets being situated alternately along the major portion of said separating tube above said sludge discharge slot, said passages forming a horizontal serpentine stratified path for said fluid past said baffles and still fluid locations therebelow, between adjacent baffles.

7. The assembly according to claim 6 in which said sludge removal means includes an elongated collecting portion formed integrally in the base of said separating tube to collect sludge, and conveyor means to remove said sludge selectively from said elongated collecting portion.

8. The assembly according to claim 7 in which the lower ends of the sides of said separating tube incline inwardly and downwardly to define an elongated discharge slot communicating with said elongated collecting portions.

9. The assembly according to claim 8 in which said elongated discharge slot forms a restriction at the lower side of said chamber and extraction means below said discharge slot for selectively removing said sludge, said system being pressurized.

10. The assembly according to claim 6 in which the lower ends of the sides of said separating tube incline inwardly and downwardly to define an elongated discharge slot communicating with said elongated collecting portions.

11. The assembly according to claim 1 in which said sludge removal means includes an elongated collecting portion formed integrally in the base of said separating tube to collect sludge, and conveyor means to remove said sludge selectively from said elongated collecting portion.

12. The assembly according to claim 11 in which the lower ends of the sides of said separating tube incline inwardly and downwardly to define an elongated discharge slot communicating with said elongated collecting portions.

13. The assembly according to claim 12 in which the sides of said baffles engage the sides of said separating tube and terminate at said elongated discharge slot.

14. The assembly according to claim 1 in which said means at the base of said separating tube to remove sludge therefrom includes a longitudinally extending fluid/sludge separator assembly and means to selectively operate said separator assembly, said separator assembly including a multi-lobed rotor and a chamber for said rotor, said rotor communicating on the upper side with said separtor tube and on the lower side with said means to remove said sludge.

15. A fluid clarifying assembly comprising in combination a mixing tube assembly having a fluid intake at one end and a fluid outlet at the other end, means to inject a plurality of discrete chemicals selectively at spaced positions along the length of said assembly to flocculate and precipitate material from said fluid thus forming a sludge, said assembly including a main shaft journalled for rotation within said assembly, said discrete chemical injection means being operatively connected to said shaft, chemical injection nozzles along the length of said shaft, separate conduits extending through said shaft and communicating between individual chemcial injection means and individual injection nozzles, a sedimentation extracting assembly having a fluid intake at one end and a fluid outlet at the other end thereof, means operatively extending between said fluid outlet of said mixing tube assembly to said fluid inlet of said sedimentation extracting assembly, said sedimentation extracting assembly including an elongated chamber, sludge collecting and settling means in said chamber including a plurality of baffles along the length of said elongated chamber guiding the sludge towards the base of said chamber, means at the base of said chamber to remove said sludge, said fluid, less the majority of the sludge, passing through said outlet means in said sedimentation extraction assembly.

16. The assembly according to claim 15 in which said sludge collecting and settling means includes a plurality of spaced apart baffles along the length of said elongated chamber, said baffles being angulated transversely to form angulated plates spanning said elongated chamber of said sedimentation extracting assembly with the included angle facing upstream.

17. The assembly according to claim 16 in which said separator tube is of rectangular cross section, said baffles including a first set of baffles and a second set of baffles, all of said baffles being substantially rectangular in cross section and spanning said extraction tube from side to side and terminating with a horizontal upper edge, said baffles of said first set having a cut-out portion at each upper corner thereof defining a divided passage past each baffle of said first set, adjacent the junction between the upper side of the walls of the separating tube and the upper side of said separating tube, said baffles of said second set having a cut-out portion centrally of the upper side of said baffles of said second section defining a passage past each baffle of said second section, centrally of the upper side and the upper wall of the separating tube, said baffles from said first and second sets being situated alternately along the major portion of said separating tube above said sludge discharge slot, said passages forming a horizontal serpentine stratified path for said liquid past said baffles and still liquid locations therebelow between adjacent baffles.

18. The assembly according to claim 15 in which said separtor tube is of rectangular cross section, all of said baffles being substantially rectangular in cross section and spanning said extraction tube from side to side and terminating with a horizontal upper edge, said baffles of said first set having a cut-out portion at each upper corner thereof defining a divided passage past each baffle of said first set, adjacent the junction between the upper side of the walls of the separating tube and the upper side of said separating tube, said baffles of said second set having a cut-out portion centrally of the upper side of said baffles of said second section defining a passage past each baffle of said second section, centrally of the upper side and the upper wall of the separating tube, said baffles from said first and second sets being situated alternately along the major portion of said separating tube above said sludge discharge slot, said passages forming a horizontal serpentine stratified path for said fluid past said baffles and still fluid locations therebelow, between adjacent baffles.

19. The assembly according to claim 15 in which the lower ends of the sides of said separating tube incline inwardly and downwardly to define an elongated discharge slot communicating with said elongated collecting portions.

20. The assembly according to claim 19 in which the sides of said baffles engage the sides of said separating tube and terminate at said elongated discharge slot.

21. The assembly according to claim 15 in which said sludge removal means includes an elongated collecting portion formed integrally in the base of said separating tube to collect sludge, and conveyor means to remove said sludge selectively from said elongated collecting portion, means at the base of said chamber to remove said sludge includes an elongated venturi section to facilitate the extraction of said sludge from said elongated chamber.

22. The assembly according to claim 15 in which said means at the base of said chamber to remove said sludge includes an elongated collecting portion formed integrally in the base of said separating tube to collect sludge, said elongated collecting portion forming a partial restriction of the lower side of said chamber and extraction means below said discharge slot for selectively removing the lower side of said sludge.

23. A fluid clarifying assembly comprising in combination a mixing tube assembly having a fluid intake at one end and a fluid outlet at the other end, means to inject chemicals selectively into said assembly to flocculate and precipitate material from said fluid thus forming sludge, a sedimentation extracting assembly having a fluid intake at one end and a fluid outlet at the other end thereof, means operatively connecting said fluid outlet of said mixing tube assembly to said fluid inlet of said sedimentation extracting assembly, said sedimentation extracting assembly including an elongated chamber, sludge collecting and settling means in said chamber including a plurality of baffles along the length of said elongated chamber guiding the sludge towards the base of said chamber, means at the base of said chamber to remove said sludge, said fluid, less the majority of said sludge, passing through said outlet means in said sedimentation extracting assembly, said separator tube being of rectangular cross section, said baffles including a first set of baffles and a second set of baffles, all of said baffles being substantially rectangular in cross section and spanning said extraction tube from side to side and terminating with a horizontal upper edge, said baffles of said first set having a cut-out portion at each upper corner thereof defining a divided passage past each baffle of said first set, adjacent the junction between the upper side of the walls of the separating tube and the upper side of said separating tube, said baffles of said second set having a cut-out portion centrally of the upper side of said baffles of said second section defining a passage past each baffle of said second section, centrally of the upper side and the upper wall of the separating tube, said baffles from said first and second sets being situated alternately along the major portion of said separating tube above said sludge discharge slot, said passages forming a horizontal serpentine stratified path for said fluid past said baffles and still fluid locations therebelow, between adjacent baffles.

24. The assembly according to claim 23 in which said sludge removal means includes an elongated collecting portion formed integrally in the base of said separating tube to collect sludge, and conveyor means to remove said sludge selectively from said elongated collecting portion.

25. The assembly according to claim 23 in which the lower ends of the sides of said separating tube incline inwardly and downwardly to define an elongated discharge slot communicating with said elongated collecting portions.

26. The assembly according to claim 25 in which the sides of said baffles engage the sides of said separating tube and terminate at said elongated discharge slot.

* * * * *